Feb. 10, 1959 W. A. GEY 2,872,870
IGNITER SQUIB
Filed Sept. 30, 1955
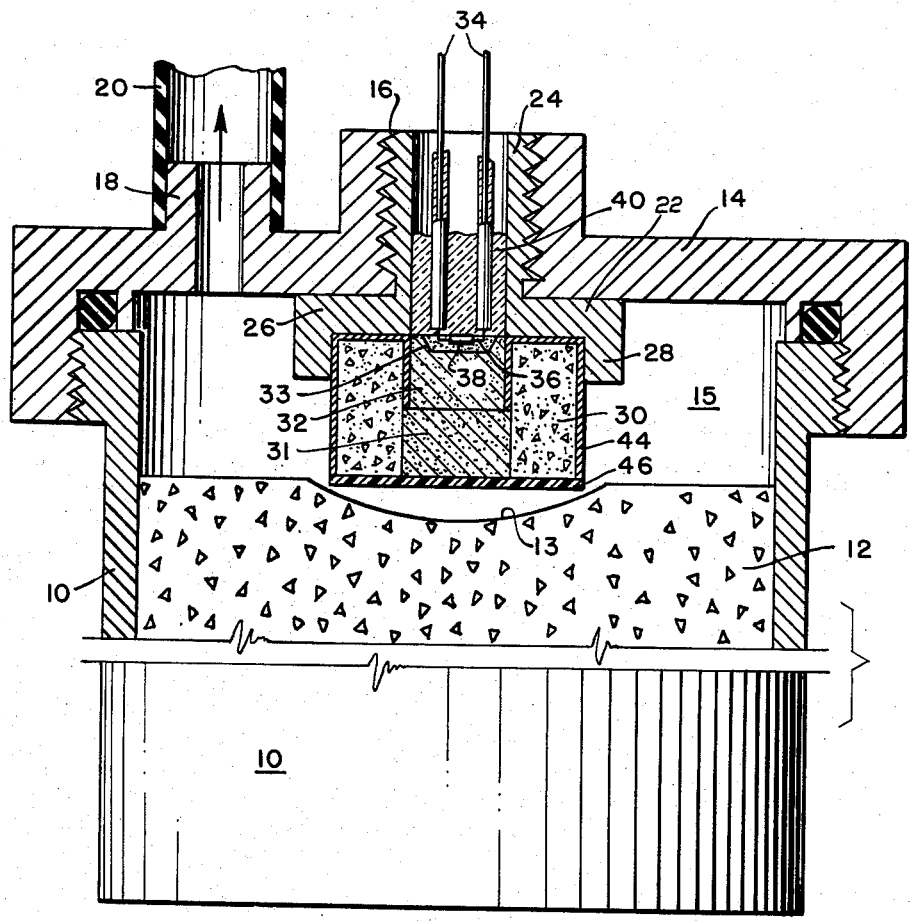
INVENTOR.
WILLIAM A. GEY
BY
ATTORNEYS 2,872,870
Patented Feb. 10, 1959

2,872,870
IGNITER SQUIB

William A. Gey, China Lake, Calif., assignor to the United States of America as represented by the Secretary of the Navy Application September 30, 1955, Serial No. 537,907

3 Claims. (Cl. 102—86.5)

(Granted under Title 35, U. S. Code (1952), sec. 266)

The invention described herein may be manufactured and used by or for the Government of the United States of America for governmental purposes without the payment of any royalties theron or therefor.

This invention relates to gas generating systems and to igniter squibs for use therein and more particularly to igniter squibs for the reliable initiation of burning of hard-to-ignite solid propellants in gas generating systems.

At the present time many mechanical devices are designed to be operated by gas under pressure and it is not uncommon to provide a gas generating system as a portion of such devices. One type of gas generating system which has been used is based upon the burning of a mass or grain of solid propellant material to provide the necesasry gases and it is preferable in such gas generating systems that the propellant used be such as to give a useful duration of burning time and provide steady burning chamber pressures. Propellants which are suitable for such purposes are generally relatively hard to ignite and the provision of suitable squib means has presented a difficult problem which has never been satisfactorily solved in many particular applications of such devices.

The igniter squib which is the subject of this invention comprises a particular structural arrangement of such selected types of materials whereby a relatively easily ignited propellant material may be caused to provide a hot flame directionally controlled to bear against the surface of the hard-to-ignite propellant grain to institute burning of the latter. Moreover, by provision of suitable sealing means, such burning of a properly selected easily ignited propellant material causes initial pressurization of the gas generating chamber to keep it pressurized until the hard-to-ignite propellant is sufficiently ignited to be capable of sustaining the required pressure. Thus, the gas generating system is pressurized to its operating pressure during the starting cycle to provide a minimum of time lag between the initiation of the system (as by closing a starting switch) and the attainment of desired operating pressures.

It is therefore an object of this invention to provide a gas generating device incorporating hard-to-ignite propellant material as the gas source and having igniter squib means adapted to quickly pressurize the burning chamber while reliably and effectively igniting the propellant material, and to maintain the burning chamber pressure until the propellant material is sufficiently ignited to sustain the pressure.

It is a further object of this invention to provide a novel igniter squib which provides a directionally controlled flame for igniting hard-to-ignite substances.

Another object of this invention is to provide a sealed igniter squib for use in closed gas generating systems, said squib having a directionally controlled flame for igniting a relatively hard-to-ignite gas generating propellant grain and being also capable of quickly pressurizing the burning chamber to its operating pressure and maintaining the pressure until the main propellant is sufficiently ignited to itself generate sufficient gases to sustain the required pressures.

Other objects and many of the attendant advantages of this invention will be readily appreciated as the same becomes better understood by reference to the following detailed description when considered in connection with the accompanying drawing wherein the single figure is a vertical sectional view of a gas generating device incorporating the igniter squib which is the subject of this invention and showing the relationship thereof to the gas generating propellant material utilized therein.

Referring now to the drawing, the single figure depicts a solid propellant gas generating system in which the igniter squib of this invention may be used. In such a system a canister 10 serves as a holding container for the relatively hard-to-ignite gas generating propellant grain 12, positioned therein, in the general position illustrated. The propellant grain 12 may be merely dropped into the canister or may be secured by suitable means, as by glue, and is of such size as to provide a burning chamber 15 in the upper portion of the canister. Canister 10 is provided with a cover member 14 provided with means to be securely attached to the open end of canister 10, as by screw threads, for example. Cover member 14 is provided with a substantially centrally located internally screw-threaded opening 16 for receiving and supporting the novel igniter squib assembly and has also a gas outlet nozzle 18 which may be provided with means for attachment to a line 20 for conducting the generated gases to a point of use.

The igniter assembly comprises a metallic (preferably steel) supporting and housing member of annular configuration having a longitudinally extending externally screw-threaded cylindrical neck portion 24 arranged for screw-threaded engagement with opening 16 of cover 14 to support the igniter assembly in operative position in burning chamber 15. Screw threaded portion 24 terminates in an outwardly directed flange portion 26 which is adapted to engage the inner wall of cover 14, and flange 26 terminates in a downwardly turned skirt portion 28 for retaining the igniter components as will be later described.

The igniter components, as retained in housing member 22 comprise a booster grain 30 which is in the form of an annulus or hollow cylinder of a relatively easy-to-ignite propellant material and of an external diameter substantially equal to or slightly smaller than the inner diameter of the skirt 28, whereby it may be retained therein with one end abutting the flange 26 and the other end extending beyond the extent of skirt 28. The central bore of booster grain 30 contains black powder in the form of a plurality of pellets 31, 32 of firmly compressed black powder which substantially fill the said bore.

The assembly comprising annular booster grain 30 with the black powder pellets 31, 32 contained in the bore thereof is suitably secured in housing 22 by the use of glue, or other securing means, in the position described in the preceding paragraph, as illustrated in the drawing. Means to initiate burning of this assembly and to retain the pressure of gases within the burning chamber are provided in the neck portion 24 of housing 22. Said means comprise a pair of lead wires 34, extending through neck portion 24 and securely held in position spaced from the walls of said neck portion by being imbedded in a mass of insulating pressure seal material 40 which fills the neck portion 24 for a substantial portion of its length from the end thereof adjacent which the booster grain and black powder assembly is attached, as shown in the drawing. The free inner ends of lead wires 34 are connected, as by soldering, to the ends of a resistance wire 36 of appropriate length and material. Resistance wire 36 is coated with an extremely easily ignited substance 38 designated a quick-fire substance which may be ignited by passing a current through the lead wires and resistance wire, to initiate burning of black powder pellets 32 and 31. Preferably, the surface of pellet 32 adjacent the resistance wire is dished, as at 33 to provide a space for the ignition means and a few grains of loose black powder may be placed in this space, as shown in the drawing, to enhance the flame created by touching off quick-fire substance 38.

In order to achieve the directional control of flame which is one of the primary novel concepts of this invention, flame inhibiting means 44 are placed upon the outer periphery of the booster grain 30. As shown in the drawing, the flame inhibiting material may be extended entirely around the inboard end of the grain 30 and substantially into the bore thereof to limit initial flame production to the outer free end of the bore in booster grain 30 to better initiate end burning of said grain. The exact structure or chemical composition of the flame inhibiting means is not critical and many variations are possible within the scope of this invention. Thus, flame inhibiting may be accomplished by extension of flange 28 to the entire length of booster grain 30 instead of depending upon flame inhibiting plastic material. If plastic material is used for this function (as shown in the drawing) any of a wide variety of plastic glue material having known flame inhibiting qualities may be used and such materials perform a dual function in that they serve to glue the grain 30 in position as well as to inhibit peripheral burning. Examples of such materials are Lucite, ethyl cellulose, cellulose acetate and various organic polysulfide compounds.

The entire assembly is capped by a thin cover disc or wafer element 46 which serves to retain the black powder pellets 31, 32 in place and to serve as a seal to protect the igniter assembly from deterioration. Seal 46 may be of propellant material or may be a thin disc of paper or metal or it may be a mixture of cellulose nitrate and black powder with a solvent which is applied as a wet thick putty which dries and hardens to form a sealing coating. The exact nature of such a seal is not critical, it being necessary only that it be of a thickness and material which will break or be destroyed by burning of the propellant components of the igniter assembly.

The specific nature of the shape of the proximate protions of the igniter assembly and of the gas generating grain 12 are not critical. It is necessary and preferable, however, that the inner end of the igniter assembly be in close proximity (in the order of ¼ inch) to the adjacent end surface of the grain 12 so that said surface can cooperate in causing combustion of the inner uninhibited end of booster grain 30 and so that the directionally controlled initiating flame of the igniter can efficiently contact the surface to be ignited. One such arrangement is illustrated in the drawing, wherein grain 12 is of a size to bring its top surface close to the end of the igniter and it is dished, as at 13 to provide a receptacle for black powder pellets blown out of bore 30 so that the burning thereof will cause end burning of booster grain 30 to be initiated and to provide a larger area for contact by the resulting flames.

It is not considered that the exact nature of the materials used is critical since the foregoing description of the invention outlines structural relationships of initiating means and propellant materials well known to persons versed in this art and is obviously sufficient to adequately teach the nature of the invention so that it could be manufactured by such persons. However, examples of specific materials which are suitable will be discussed to further clarify the disclosure. The nature of materials suitable for the cover disc 46 and for the flame inhibiting means 44 have been adequately treated hereinabove and will not be further discussed.

Sealing material 40 may be of any composition having the requisite insulating and sealing properties and, although lead-glass material is preferred, there are many other materials known to have qualities which fit them for this usage.

Resistance wire 36 and its coating of quick-fire substance 38 may each be chosen of a wide variety of materials and such selection is well within the cognizance of any person skilled in this art. In the specific example herein illustrated, the resistance wire utilized was a platinum wire 0.001 inch in diameter and having from 1 to 1.25 ohms of resistance, and it should be obvious that either the same resistance could be formed of other conductor material or that the amount of resistance could be varied depending upon the nature of the electric circuit and the degree of sensitivity desired. Similarly a wide variety of quick-fire substances which are obviously suitable for performing the function of the quick-fire coating 38 are well known in the art, as for example the conventional compositions comprising about 75% diazodinitrophenol and about 25% of potassium chlorate.

Booster charge or grain 30 and the main gas generating propellant grain 12 are of relatively easy and hard-to-ignite materials respectively, and as stated above, it is considered that persons skilled in this art could choose such materials from many which have well known qualities suitable for the disclosed purpose. Materials having a burning rate in the order of 0.40–0.75 in./sec. at 1000 p. s. i. and 70° F., are suitable for use as relatively easy burning material and examples of such materials are the double base powder propellants known as JP and JPN, which are particular Ballistite formulae. For the relatively hard-to-burn main gas generating charge it is preferred to utilize material having a burning rate in the order of 0.30 in./sec. or less at 1000 p. s. i. and 70° F., and one example of such a material is the double base powder propellant known as Russian cordite. These materials and their composition and qualities are discussed in chapters 2 and 3 of "Internal Ballistics of Solid-Fuel Rockets" by R. N. Wimpress, published in 1950 by McGraw-Hill Book Company, Inc.

While the above detailed description of the structure and materials of the gas generator and igniter squib which form the subject matter of this invention are considered to be adequate to make the operation thereof understandable, it is nevertheless considered expedient to give a short description of the operation of the device at this point. Upon the passage of an electrical current through lead wires 34 and resistance wire 36, the later is heated and ignites the quick-fire substance 38. This ignites the loose black powder retained in dished portion 33 of black powder pellets 32 and ignites pellets 32 and 31. The flame and gases developed by the burning of this black powder destroys seal 46 and the black powder pellets are thrown out into the space between the booster grain 30 and the gas generating grain 12 and ignite the outer uninhibited bore portion and the end of the booster grain 30 (the periphery of grain 30 being inhibited against burning by inhibiting means 44.) This then throws or directs a hot jet of flame against the grain 12 and ignites it. By virtue of the use of sealing means 40 the gases formed in burning the booster grain 30 form a high initial usable gas pressure prior to igniting or full operational burning of the main gas generating grain 30 to provide more immediate response of the gas generating system to a starting signal than would be otherwise possible.

From the above, it should be evident that this invention provides an improved device for providing pressure gases by burning solid propellant materials in a combustion chamber, in which ignition of the main gas producing material is more reliably achieved and in which usable pressures are made available more quickly then was heretofore possible. This novel result is achieved by the provision of a properly related igniter assembly which provides a directionally controlled flame to ignite said gas producing material and a seal to retain the gas pressure produced in providing hot flame in the main combustion chamber of the gas generating device to sustain and maintain operating gas pressure until the main gas generating material is sufficiently ignited to itself maintain desired pressure.

While only a single structural arrangement of parts has been illustrated and specifically described herein, and only a few illustrative examples of preferred materials have been given, it is obvious that many other variations and modifications are possible in both the structure and choice of materials, in the light of the teachings of this disclosure. It is accordingly to be understood that the scope of the invention is not intended to be limited by the specific illustrative examples given but rather by the scope and language of the appended claims.

What is claimed is:

1. An igniter squib assembly comprising a supporting and housing member of annular configuration having a longitudinally extending hollow cylindrical neck portion, said neck portion terminating in an outwardly directed flange portion having a downwardly turned skirt portion extending in the opposite direction from said neck portion; a cylindrical booster grain of propellant supported within the skirt portion of said housing member and having the inboard end thereof abutting against said flange portion and the opposite free end thereof extending beyond the extent of said skirt portion, said booster grain having a central bore aligned with said hollow cylindrical neck portion, flame inhibiting means placed upon said booster grain about its outer periphery and inboard end and extending substantially into the central bore thereof to limit initial flame production to the outer free end of said bore to better initiate end burning of said booster grain, means for securing said booster grain within said skirt portion, the central bore of said booster grain containing a plurality of compressed black powder pellets in direct contact with each other and which substantially fill said bore, means attached to said free end of the booster grain serving as a closure to retain said black powder pellets in said bore and for protection from deterioration, said closure means being destroyed by burning of the igniter propellants, means for initiating burning of said black powder pellets operable to ignite said booster grain.

2. An igniter squib assembly comprising a supporting and housing member of annular configuration having a longitudinally extending hollow cylindrical neck portion, said neck portion terminating in an outwardly directed flange portion having a downwardly turned skirt portion extending in the opposite direction from said neck portion; a cylindrical booster grain of propellant supported within the skirt portion of said housing member and having the inboard end thereof abutting against said flange portion and the opposite free end thereof extending beyond the extent of said skirt portion, said booster grain having a central bore aligned with said hollow cylindrical neck portion, flame inhibiting means placed upon said booster grain about its outer periphery and inboard end and extending substantially into a portion of the central bore thereof to limit initial flame production to the outer free end of said bore to better initiate end burning of said booster grain, means for securing said booster grain within said skirt portion, the central bore of said booster grain containing a plurality of compressed black powder pellets in direct contact with each other and which substantially fill said bore, means attached to the free end of said booster grain serving as a closure to retain said black powder pellets in said bore and for protection of the propellants against deterioration, said closure means being destroyed by burning of the igniter propellants, means to initiate burning of said black powder pallets for igniting said booster grain and for retaining the pressure of gases of combustion comprising a pair of electrical lead wires extending through said hollow cylindrical neck portion to said black powder pellets and securely held in position spaced from the walls of said neck portion by being embedded in a mass of insulating pressure seal material which fills said neck portion for a substantial portion of its length, the ends of said lead wires adjacent said black powder pellets being connected to the ends of a resistance wire which is coated with an extremely easily ignited substance and operable to ignite said black powder upon passing a current through said lead wires and resistance wire.

3. An igniter squib assembly for use with gas generator devices comprising a supporting and housing member of annular configuration having a longitudinally extending hollow cylindrical neck portion, said neck portion terminating in an outwardly directed flange portion having a downwardly turned skirt portion extending in the opposite direction from said neck portion, a cylindrical booster grain of propellant supported within the skirt portion of said housing member and having the inboard end thereof abutting against said flange portion and the opposite free end thereof extending beyond the extent of said skirt portion, said booster grain having a central bore aligned with said hollow cylindrical neck portion, flame inhibiting means placed upon said booster grain about its outer periphery and inboard end and extending substantially into a portion of the central bore thereof to limit initial flame production to the outer free end of said bore to better initiate end burning of said booster grain, means for securing said booster grain within said skirt portion, the central bore of said booster grain containing a plurality of compressed black powder pellets in direct contact with each other and which substantially fill said bore, means attached to the free end of said booster grain serving as a closure to retain said black powder pellets in said bore and for protection of the propellants against deterioration, said closure means being destroyed by burning of the igniter propellants, means to initiate burning of said black powder pellets for igniting said booster grain and for retaining the pressure of gases of combustion comprising a pair of electrical lead wires extending through said hollow cylindrical neck portion to said black powder pellets and securely held in position spaced from the walls of said neck portion by being imbedded in a mass of insulating pressure seal material which fills said neck portion for a substantial portion of its length, the ends of said lead wires adjacent said black powder pellets being connected to the ends of a resistance wire which is coated with an extremely easily ignited substance and operable to ignite said black powder upon passing a current through said lead wires and resistance wire, the surface of the black powder pellet adjacent said resistance wire being dished to provide space for the resistance wire and having grains of loose black powder placed therein to enhance the flame created by said easily ignited substance upon passing a current through said resistance wire.

References Cited in the file of this patent

UNITED STATES PATENTS

| | | |
|---|---|---|
| 1,516,009 | Grane et al. | Nov. 18, 1924 |
| 2,447,758 | Lubbock | Aug. 24, 1948 |
| 2,464,650 | Pass et al. | Mar. 15, 1949 |
| 2,561,670 | Miller | July 24, 1951 |
| 2,563,265 | Parsons | Aug. 7, 1951 |
| 2,696,191 | Sheehan | Dec. 7, 1954 |